(12) United States Patent
Varin et al.

(10) Patent No.: US 9,643,341 B2
(45) Date of Patent: May 9, 2017

(54) MOLD COMPRISING SHELLS AND AT LEAST ONE SLIDE

(71) Applicants: SNECMA, Paris (FR); SAFRAN, Paris (FR)

(72) Inventors: Franck Bernard Leon Varin, Voulangis (FR); Thierry Chauvin, Ermenonville (FR)

(73) Assignees: SNECMA, Paris (FR); SAFRAN, Paris (FR)

( * ) Notice: Subject to any disclaimer, the term of this patent is extended or adjusted under 35 U.S.C. 154(b) by 0 days.

(21) Appl. No.: 14/765,614

(22) PCT Filed: Feb. 4, 2014

(86) PCT No.: PCT/FR2014/050205
§ 371 (c)(1),
(2) Date: Aug. 4, 2015

(87) PCT Pub. No.: WO2014/118485
PCT Pub. Date: Aug. 7, 2014

(65) Prior Publication Data
US 2016/0001466 A1  Jan. 7, 2016

(30) Foreign Application Priority Data
Feb. 4, 2013  (FR) ..................................... 13 50927

(51) Int. Cl.
*B29C 33/00* (2006.01)
*B29C 33/30* (2006.01)
(Continued)

(52) U.S. Cl.
CPC .......... *B29C 33/0044* (2013.01); *B29C 33/30* (2013.01); *B29C 33/44* (2013.01); *B29C 37/005* (2013.01); *B29C 45/33* (2013.01)

(58) Field of Classification Search
CPC ............ B29C 45/33; B29C 2045/4068; B29C 45/4435; B29C 2045/442
See application file for complete search history.

(56) References Cited

U.S. PATENT DOCUMENTS

| 1,092,195 | A | * | 4/1914 | Workman | ............... B28B 7/183 |
| | | | | | 249/101 |
| 4,882,118 | A | | 11/1989 | Megarry | |
| 5,772,822 | A | | 6/1998 | Dupuy | |

FOREIGN PATENT DOCUMENTS

| EP | 0 197 709 A2 | 10/1986 |
| EP | 1 216 808 A1 | 6/2002 |

(Continued)

OTHER PUBLICATIONS

Kasahara et al., English Abstract of JP H04-327921 A, Nov. 1992.*
International Search Report issued May 8, 2014, in PCT/FR2014/050205, filed Feb. 4, 2014.

*Primary Examiner* — Ryan Ochylski
(74) *Attorney, Agent, or Firm* — Oblon, McClelland, Maier & Neustadt, L.L.P.

(57) ABSTRACT

A mold includes a first shell and a second shell that are suitable, in the closed position, for imparting a shape to a part that is to be molded in the mold, a main axis being perpendicular to the main plane in which the first shell and the second shell extend. The mold further includes a slide that is situated between the first shell and the second shell and that is in contact with the first shell and the second shell when the mold is in the closed position, and that is to come into contact with the molded part, the slide presenting a first face that constitutes its interface with the first shell, the first face presenting a primary direction along which the slide is suitable for sliding along the first face when the mold is in the open position.

6 Claims, 3 Drawing Sheets

(51) Int. Cl.
    *B29C 33/44*    (2006.01)
    *B29C 37/00*    (2006.01)
    *B29C 45/33*    (2006.01)

(56)         References Cited

FOREIGN PATENT DOCUMENTS

| | | |
|---|---|---|
| JP | 62-152826 A | 7/1987 |
| JP | 04-327921 A | 11/1992 |
| JP | 07-223042 A | 8/1995 |
| JP | 2004-098654 A | 4/2004 |

* cited by examiner

MOLD COMPRISING SHELLS AND AT LEAST ONE SLIDE

BACKGROUND OF THE INVENTION

Field of the Invention

The present invention relates to the field of part molding.

More particularly, the invention relates to a mold comprising a first shell and a second shell that are suitable, in the closed position, for imparting a shape to a part that is to be molded in the mold, a main axis A being perpendicular to the main plane in which the first shell and the second shell extend.

Description of the Related Art

A mold used for molding a part comprises a first shell and a second shell. Each shell possesses a shape that is more or less complex depending on the shape desired for the part after it has been molded, nevertheless, each shell extends essentially in a main plane. The main axis is defined as being the axis that is perpendicular to the main plane of the first shell, and to the main plane of the second shell when the mold is in the closed position.

The mold is in the closed position when the first shell and the second shell are in contact with each other around all (or practically all) of their periphery so as to imprison a volume that is to be filled with the material of the part during the process of molding the part.

The molded part may for example be made of a polymer, or of a composite material constituted by a polymer reinforced by fibers (e.g. carbon fibers).

The molding method comprises a stage of heating the part to a temperature higher than ambient temperature, during which the first shell and the second shell are held pressed one against the other (closed position). When the molded part is made of polymer, this heating stage comprises a stage of polymerizing the polymer, at a temperature lying in the range 80° C. to 500° C. The mold is in a closed position not only during this heating stage, but also during subsequent cooling of the molded part down to its unmolding temperature, so as to ensure that the part takes on the desired shape (the shape defined by the volume between the two shells). When the molded part is made of a polymer or of a composite, this unmolding temperature is lower than the glass transition temperature of the polymer. By way of example, this unmolding temperature may be ambient temperature.

Such molds present drawbacks. Specifically, the material of the molded part usually presents a coefficient of thermal expansion that is different from the coefficient of thermal expansion of the material constituting the first shell and the second shell. When the coefficient of expansion of the part is less than that of the shells in at least one direction, then this difference leads to undesirable stresses being applied to the part while it is cooling, which stresses run the risk of irreversibly damaging the part and/or can lead to difficulties in extracting the part from the mold since the part remains jammed tightly in the mold.

BRIEF SUMMARY OF THE INVENTION

The present invention seeks to remedy those drawbacks.

The invention seeks to propose a mold that makes it possible to unmold the part easily after it has been molded, and that does not generate undesirable stresses in the part during molding of the part.

This object is achieved by the fact that the mold includes at least one slide that is situated between the first shell and the second shell and that is in contact with the first shell and the second shell when the mold is in the closed position, and that is to come into contact with the molded part, the or each slide presenting a first face that constitutes its interface with the first shell, the first face presenting a primary direction along which the slide is suitable for sliding along the first face when the mold is in the open position.

By means of these arrangements, the mold does not generate undesirable stresses in the part while it is cooling and it limits residual stresses. After releasing the pressure that keeps the first shell in contact with the second shell (in the closed position), the two shells are moved far enough apart from each other to release the space needed to allow each slide to slide along the first face of the first shell in the primary direction of the slide, and thus avoid the slides exerting stresses on the part. Furthermore, the part can be unmolded without difficulty.

BRIEF DESCRIPTION OF THE SEVERAL VIEWS OF THE DRAWINGS

The invention can be well understood and its advantages appear better on reading the following detailed description of an embodiment given by way of non-limiting example. The description refers to the accompanying drawings, in which.

DETAILED DESCRIPTION OF THE INVENTION

Figure 1:
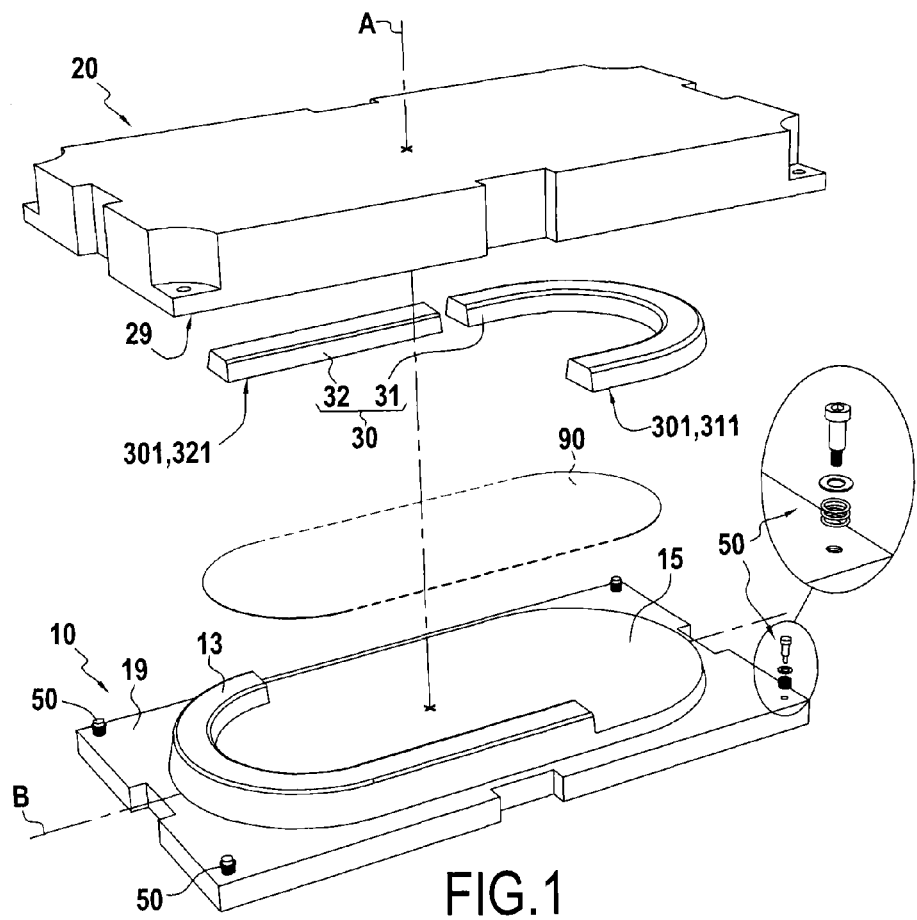
FIG. 1 is an exploded view in perspective of a mold of the invention in the open position.

FIG. 1 shows a mold 1 of the invention that comprises a first shell 10 and a second shell 20, together with one or more slides 30 that are positioned and that function as described below.

The first shell 10 extends in a first main plane, and the second shell 20 extends in a second main plane. The mold 1 is in the closed position when the first shell 10, the second shell 20, and the slide(s) 30 are in contact with one another so as to define a closed volume V that is to contain the material for making the part 90 during the process of molding the part 90. When the mold 1 is in the closed position, the first main plane and the second main plane are parallel to a common main plane (the main plane of the mold 1), and they are perpendicular to an axis A, which is the main axis of the mold 1. The main axis A passes through the geometrical center of the internal portion 15.

When the mold 1 passes from an open position to a closed position, the first shell 10 and the second shell 20 move towards each other along the main axis A until they touch. When the mold 1 passes from a closed position to an open position, the first shell 10 and the second shell 20 move apart from each other through a non-zero distance along the main axis A. The open position corresponds to the situation in which the force (or pressure) that holds the first shell 10 and the second shell 20 in contact is removed, thus enabling the two shells to move apart from each other.

In the description below, the terms "inner" and "outer" designate a fraction that is situated respectively radially closer to or farther away from the main axis A of the mold or that faces respectively radially towards or away from the main axis A.

The slide(s) 30 form a fraction of the periphery of the volume V, and each of them is thus in contact with the material of the part 90 that is to be molded during the process of molding the part.

FIG. 1 is an exploded view of the mold 1 of the invention when the mold 1 has two slides: thus, the mold 1 has a first slide 31 and a second slide 32.

The first shell 10 presents a border 13 that surrounds in part the inner portion 15 of the surface of the first shell 10 that is to be filled with the material of the part 90 while it is being molded. The border 13 thus forms a fraction (i.e. not all) of the perimeter of this inner portion 15 in the first main plane. The border 13 is in elevation relative to the inner portion 15 so as to contain radially (laterally) the material of the part 90 that is to be molded on the inner portion 15.

When the mold 1 is in the closed position, the first slide 31 and the second slide 32 come into contact with each other and with the border 13 so as to form the entire perimeter of the inner portion 15.

The perimeter of the inner portion 15 presents two longitudinal sides facing each other, and two transverse sides facing each other, a first end of one of the longitudinal sides being connected to the first end of the other longitudinal side (facing the first end of one of the longitudinal sides) by one of the transverse sides, and the second end of one of the longitudinal sides being connected to the second end of the other longitudinal side (facing the second end of one of the longitudinal sides) by the other transverse side.

In the embodiment of FIG. 1, the perimeter of the internal portion 15 is oblong in shape, the two longitudinal sides being rectilinear and parallel, while each transverse side is curved so as to present a U-shape. The first longitudinal side thus extends one of the branches of each of the transverse sides, and the second longitudinal side extends the other branch of each of the transverse sides.

Figure 2:
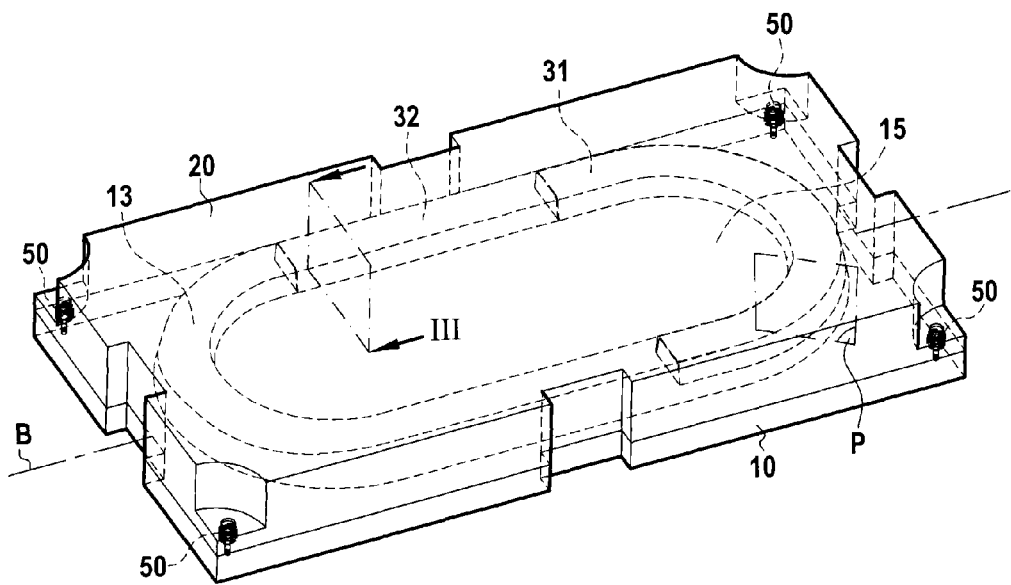
FIG. 2 is a perspective view of a mold of the invention in the closed position.

The longitudinal direction is represented by the longitudinal axis B in FIGS. 1 and 2.

The border 13 is constituted by one of the transverse sides and one of the longitudinal sides, and is thus J-shaped.

The first slide 31 is constituted by the other transverse side. The second slide 32 is constituted by the other longitudinal side.

When the mold 1 is in the closed position, one of the ends of the first slide 31 is in contact with the end of the border 13, the other end of the first slide 31 is in contact with an end of the second slide 32, and the other end of the slide 32 is in contact with the other end of the border 13.

FIG. 2 shows the mold 1 in the closed position.

The second shell 20 fits closely around the border 13, the first slide 31, and the second slide 32, all along the perimeter of the inner portion 15, such that between the two shells only a volume (the volume V) lying above the inner portion 15 is free, this volume being for containing the material that is to be molded in order to form the part 90 (where appropriate, one or more channels connect this volume V to the outside of the mold so as to enable the material that is to form the part 90 to be injected).

Figure 3:
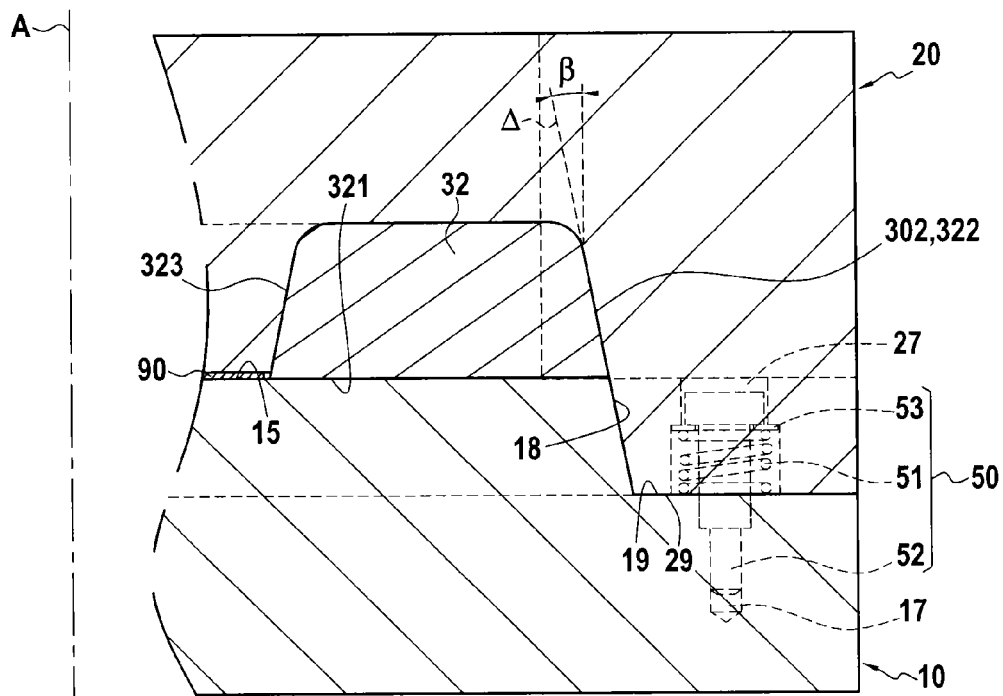
FIG. 3 is a fragmentary section view of the FIG. 2 mold on plane III-III.

Outside the border 13, the first slide 31, and the second slide 32, the first shell 10 advantageously presents a first outer portion 19 that extends in the main plane, this first outer portion 19 being in contact over the majority of its surface with a second outer portion 29 of the second shell 20 when the mold 1 is in the closed position (see FIG. 3).

Sealing of the mold 1 is thus improved, and it is easier to obtain. The method of molding a part 90 is thus more robust.

The mold 1, shown in FIG. 1 in exploded view and in FIG. 2 in the closed position, presents such outer portions.

FIG. 3 is a section through the second slide 32 in the plane III-III, which is a plane perpendicular to the longitudinal direction of the second slide 32. The plane III-III thus passes from the inside of the mold 1 (volume that is to contain the material for molding) to the outside of the mold 1.

The plane III-III (transverse plane) thus shows the cross-section of the second slide 32. The plane III-III is vertical if the main axis A is vertical.

The second slide 32 presents a first face 321 (also referenced 301 in FIG. 1) that is in contact with the inner portion 15 of the surface of the first shell 10. The first face 321 constitutes the interface between the second slide 32 and the inner portion 15.

During molding, the mold 1 is in the closed position, and the material that is to form the part 90 is sandwiched between the inner portion 15 of the surface of the first shell 10 and a portion of the surface of the second shell 20 (and thus occupies the volume V). The inner face 323 of the second slide 32 is thus in contact with the second shell 20, and with the part 90. The first shell 10 and the second shell 20 are held against one another and the material that is to form the part 90 is heated so as to shape the material and polymerize it in the desired shape, i.e. the final shape for the part 90.

The second slide 32 presents a second face, the outer face 322 (also referenced 302 in FIG. 3) that is in contact with the second shell 20. The outer face 322 is inclined relative to the main axis A and relative to the inner portion 15 and it approaches the main axis A on going away from the inner portion 15 (i.e. on going away from the first face 321). Thus, in any cross-section plane of the second slide 32, such as the plane III-III, the second slide 32 presents a top (face farthest away from the first plane face 321) that is narrower than the first plane face 321.

Thus, in every transverse plane, the outer face 322 passes via a line perpendicular to said main axis A and via a line Δ at an angle θ lying strictly between 0° and 90° relative to the main axis A, such that the second slide 32 and the second shell 20 are suitable for sliding relative to each other along the outer face 322 along the direction of the line Δ when the mold 1 is in the open position. The line Δ approaches the main axis A going away from the first shell 10 towards the second shell 20.

As shown in FIG. 3, when the mold 1 is in the closed position, the second shell 20 prevents the second slide 32 from moving towards the inside of the mold 1, and in particular prevents it from moving in radial translation. As explained above, this comes from the fact that the second shell 20 is in contact, in the closed position of the mold, with the inner face 323 of the second slide 32. Likewise, when the mold 1 is in the closed position, the second shell 20 prevents the second slide 32 from moving towards the outside of the mold 1, and in particular prevents it from moving in radial translation. As explained above, this comes from the fact that the second shell 20 is in contact, in the closed position of the mold, with the outer face 322 of the second slide 32. Thus, when the mold is in the closed position, the second shell 20 blocks any movement in radial translation of the second slide 32. Consequently, in the closed position, the shape of the part for molding is defined in a manner that is reliable and that cannot change unexpectedly, thereby guaranteeing molding quality.

In the example shown in FIGS. 1 to 4, since the second slide 32 is rectilinear, the orientation of the line Δ in a transverse plane of the second slide 32 is identical on moving along the perimeter of the inner portion 15 from one transverse plane to another.

In the example shown in FIGS. 1 to 4, since the first slide 31 is curved and has the shape of a truncated cone, the orientation of the line Δ in a transverse plane of the first slide 31 varies on moving along the perimeter of the inner portion 15 from one transverse plane to another.

More generally, the surface of the outer face (second face) of each of the slides 30 is such that in any transverse plane of the slide 30, there exists a main direction that is the direction along which the outer face 302 of the slide 30 is suitable for sliding along the second shell 20 when the mold 1 is in the open position. This main direction is the direction of the line Δ. Thus, under all circumstances (including the example shown in FIGS. 1 to 4), the angle β between the line Δ and the main axis A is constant regardless of the transverse plane of the slide 30 in which the line Δ extends. After molding, while the part 90 is cooling, the pressure that holds the first shell 10 and the second shell 20 against each other is relaxed such that the second shell 20 moves away from the first shell 10 in the direction of the main axis A. The mold 1 is then in the open position.

As a result, a space is released between the outer face 322 and the second shell 20. Thus, during cooling, the second slide 32 is suitable for moving in translation radially outwards along the first face 321 (going away from the main axis A) towards the second shell 20, in a direction perpendicular to the longitudinal axis B, which is thus the primary direction of the first face 321. The second slide 32 moves in translation at most until the outer face 322 comes once more into contact with the second shell 20. Consequently, the second slide 32 does not compress the material of the part 90 during cooling, and the residual stresses present in the part 90 are minimized.

The part 90 is also easy to unmold.

Figure 4:
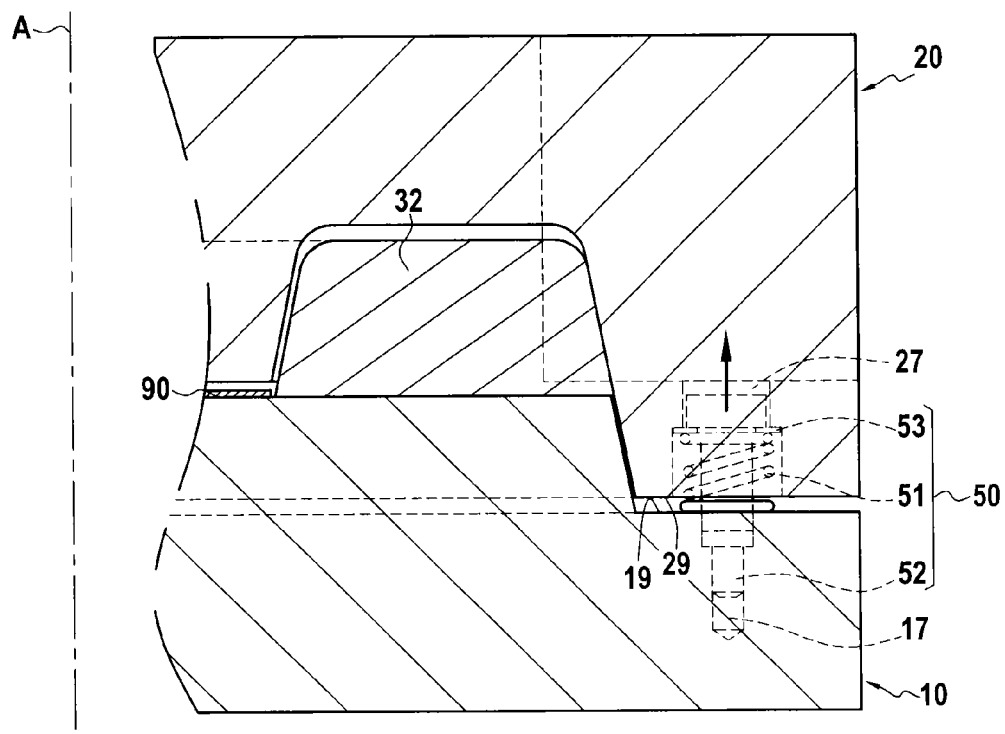
FIG. 4 is a fragmentary section view of the FIG. 2 mold in the plane III-III, the mold being in the open position.

This situation is shown in FIG. 4.

Because the slide(s) 30 of the invention enable the material of the part 90 to expand, such a slide may be referred to as an "expansion" slide.

In FIGS. 1 to 4, the first outer portion 19 of the first shell 10 is lower than the surface of the inner portion 15 and the first face 321, and it is connected to the perimeter of the inner portion 15 by a rim 18. The rim 18 is rectilinear in a transverse plane such as the plane III-III. Thus, the outer face 322 is situated in line with the rim 18 when the mold 1 is in the closed position.

Such a configuration makes it easier for the mold 1 to pass between the closed position and the open position.

Alternatively, the rim 18 may be situated on the outside relative to the outer end of the second slide 32, i.e. the perimeter of the inner portion 15 is extended outwards beyond the outer end of the second slide 32.

The rim 18 may optionally be parallel to the main axis A.

The description given above for the second slide 32 is equally valid for the first slide 31.

Thus, in a transverse plane P shown in FIG. 2, which is a section plane of the first slide 31, the section of the first slide 31 is identical to the section of the second slide 32 shown in FIG. 3, the first face 321, the outer face 322, and the inner face 323 of the second slide 32 being replaced respectively by the first face 311, the outer face 312, and the inner face 313 of the first slide 31. The first face 311 is also referenced 301 in FIG. 1.

When the second shell 20 moves away from the first shell 10, the first slide 31 is suitable for moving in translation radially towards the outside along the first face 311. The first slide 31 moves in translation in a longitudinal direction, i.e. along the longitudinal axis B, which is thus the primary direction of the first face 311.

More generally, the outer faces 313, 322 and the inner faces 313, 323 are not necessarily plane. These faces may be concave or convex, or they may present some other shape depending on the shape of the part 90 that is to be molded, provided that these faces fit closely to the faces of the second shell 20 when the mold 1 is in the closed position, and provided that it is possible for the mold 1 to pass between the open position and the closed position.

In general manner, the first slide 31 presents a shape that is other than a U-shape, as a function of the shape of the part 90 that is to be molded. For example, the first slide 31 is rectilinear and extends in a transverse direction, i.e. in a direction perpendicular to the longitudinal axis B. Whatever its shape, one of the ends of the first slide 31 bears against an end of the second slide 32, and the other end of the first slide 31 bears against an end of the border 13 when the mold 1 is in the closed position, such that the first slide 31, the second slide 32, and the border 13 form the entire perimeter of the inner portion 15.

Advantageously, the mold 1 also has at least one return device 50 that is suitable for exerting a force between the first shell 10 and the second shell 20 so as to move the first shell 10 and the second shell apart from each other away from the closed position towards the open position.

The return device 50 is particularly useful when the first shell 10 does not move far enough from the second shell 20 after removing the pressure that holds the two shells in contact. Thus, the first shell 10 and the second shell 20 can be moved far enough apart from each other for the first slide 31 and the second slide 32 to have enough space to move in translation radially outwards without generating stresses in the part 90.

FIGS. 1 to 4 show an embodiment of the return device 50.

The return device 50 comprises at least two assemblies, each constituted by a helical spring 51, a peg 52 that is inserted coaxially inside the spring 51 (on the main axis of the spring 51), and a washer 53. In the first outer portion 19, the first shell 10 presents a first circular bore 17 that receives the head of the peg 52, and in the second outer portion 29, the second shell 20 presents a second circular bore 27 that receives the head of the peg 52, the washer 53, and the spring 51.

When the mold 1 is in the closed position (as a result of the pressure that holds the first shell 10 pressed against the second shell 20), the spring 51 is compressed, one end of the spring 51 bearing against the washer 53, which in turn bears against a shoulder in the second bore 27, the other end of the spring 51 bearing against the first outer portion 19. When the pressure exerted on the mold 1 is relaxed, the spring 51 expands and thus contributes to moving the second shell 20 away from the first shell 10.

Instead of a helical spring, some other type of spring could be used, e.g. a "Belleville" type spring washer.

Advantageously, as shown in FIGS. 1 and 2, the return device 50 has four assemblies of the kind described above, each assembly being located on the first outer portion 19 at a respective one of the four corners of the mold 1.

This configuration serves to distribute the spacing-apart forces uniformly between the first shell 10 and the second shell 20, and thus serves to obtain movement in translation of the second shell 20 along the main axis A.

The invention is described above in the context of the mold 1 having two slides 30, one of the slides being suitable for moving in translation in the main plane of the mold in a longitudinal direction along the longitudinal axis B while the mold 1 is in the open position, and the other slide 30 being suitable for moving in translation in the main plane in a direction that is perpendicular to the longitudinal axis B.

The slides may be of any shape so long as they allow the mold 1 to pass between the open position and the closed position.

Thus, during cooling, the material of the part 90 is not compressed in any direction.

In general manner, the mold 1 of the invention may present more than two slides 30.

Advantageously, and as described above, each slide 30 presents a second face 302 in contact with the second shell 20, the second face 302 being an outer face and being such that in any transverse plane of the slide 30, there exists a main direction defined by a line Δ at an angle β that lies strictly between 0° and 90° relative to the main axis A, in such a manner that the second face 302 of the slide 30 and the second shell 20 are suitable for sliding relative to each other along the second face 302 in the main direction when the mold 1 is in the open position, the angle β between the line Δ and the main axis A being constant regardless of the transverse plane of the slide 30 in which the line Δ extends.

In another embodiment, the shell 10 does not have a border 13. The mold 1 has one or more slides that replace the border 13. When the mold 1 is in the closed position, the slides together make up the entire perimeter of the inner portion 15.

In the invention, under all circumstances, each slide 30 is suitable for moving in translation radially towards the outside (going away from the main axis A) so as to avoid exerting stress on the part 90 during cooling in the mold 1.

In the above description, the first face 301 (also referenced 311 and 321, and fitting closely to the perimeter of the inner portion 15) of each of the slides 30 is plane, and the inner portion 15 of the first shell 10 is plane.

Figure 5:
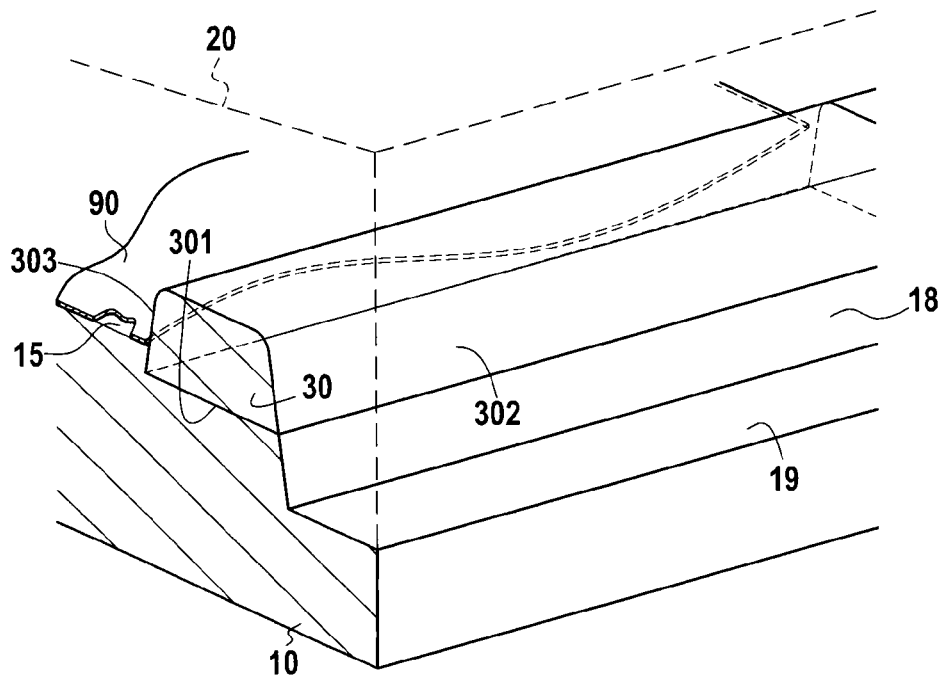
FIG. 5 is a fragmentary perspective view of the mold of the invention when the edges of the part 90 that is to be molded are not plane.

The first face 301 of one of the slides 30 (or of a plurality of slides 30) may also be plane when the inner portion 15 is not plane (i.e. the edges of the part 90 that is to be molded are not plane), provided that each edge fraction of the part 90 that is to be molded encounters the inner face 302 of one of the slides 30 when resting on the inner portion 15. This situation is shown in FIG. 5.

Thus, when the mold 1 passes from the closed position to the open position, each slide 30, by moving in translation radially towards the outside, releases space to enable the part 90 to be suitable for extending radially outwards without being compressed.

Figure 6:
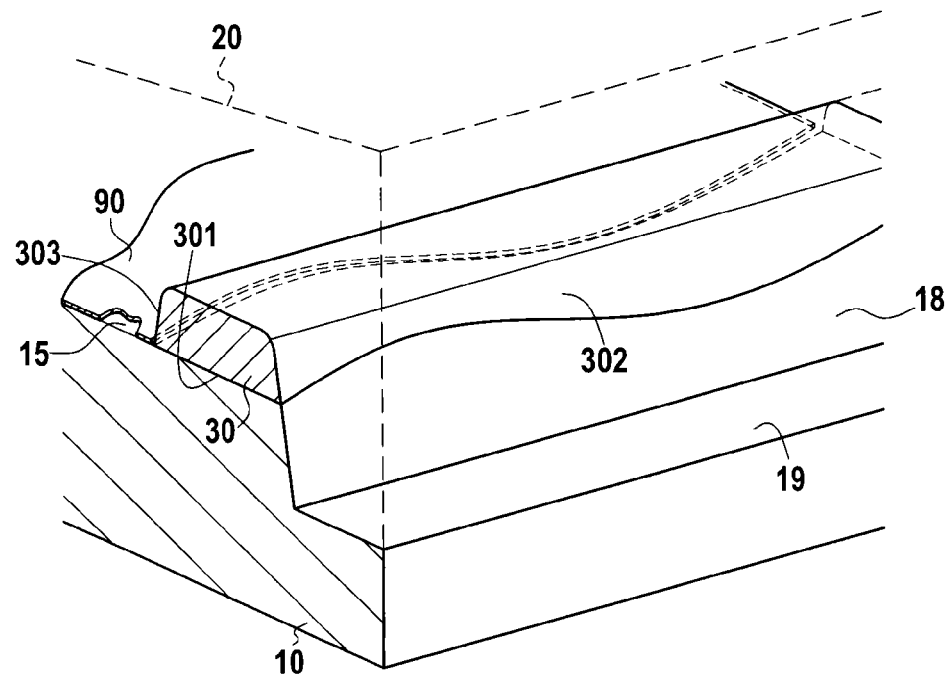
FIG. 6 is a fragmentary perspective view of a variant of the mold of the invention when the edges of the part 90 that is to be molded are not plane.

In a variant, when the edges of the part 90 that is to be molded are not plane, the first face 301 of one of the slides 30 (or of a plurality of slides 30) extends the profile of the inner portion 15 adjacent thereto radially outwards. Thus, the edge fraction of the part 90 that is to be molded meets the bottom end of the inner face 303 of one of the slides 30 when resting on the inner portion 15. This situation is shown in FIG. 6.

Thus, when the mold 1 passes from the closed position to the open position, each slide 30, by moving in translation radially towards the outside, releases space so that the part 90 can extend radially towards the outside on the radially inner fraction of the perimeter of the portion 15 against which the first face 301 was closely fitted, and can do so without being compressed.

In general manner, as a function of the shape of the part that is to be molded, the first shell 10 and/or the second shell 20 may be made up of a plurality of disjoint sub-shells that are mutually separable.

The invention claimed is:

1. A mold, comprising:
    a first shell and a second shell that are suitable, in a closed position, for imparting a shape to a part that is to be molded in said mold, a main axis being perpendicular to a main plane in which said first shell and said second shell extend; and
    first and second slides that are situated between said first shell and said second shell and that are in contact with said first shell and said second shell when said mold is in the closed position, and that are to come into contact with said molded part, each of said first and second slides presenting a first face that constitutes an interface with said first shell, said first face presenting a primary direction along which each of the first and second slides is suitable for sliding along said first face when said mold is in the open position, the first slide being suitable for moving in translation in the main plane in a longitudinal direction along a longitudinal axis when the mold is in the open position, and the second slide being suitable for moving in translation in the main plane in a direction perpendicular to said longitudinal axis,
    wherein a contact interface between each of the first and second slides and the second shell is situated in line with a contact interface between the first shell and the second shell, in a direction having a non-zero component with respect to the main axis.

2. The mold according to claim 1, wherein each of the first and second slides presents a second face in contact with said second shell, said second face being an outer face and being such that in any transverse plane of one of the first and second slides, there exists a main direction defined by a line Δ at an angle β that lies strictly between 0° and 90° relative to said main axis, in such a manner that the second face of one of the first and second slides and said second shell are suitable for sliding relative to each other along said second face in said main direction when said mold is in the open position, the angle β between said line Δ and said main axis being constant regardless of the transverse plane of one of the first and second slides in which said line Δ extends.

3. The mold according to claim 1, further comprising:
    at least one return device that is suitable for exerting a force between said first shell and said second shell in such a manner as to move the first shell and the second shell apart from each other away from the closed position of the mold towards the open position of the mold.

4. The mold according to claim 1, wherein when the mold is in the closed position, the second shell prevents movement in radial translation of each slide.

5. The mold according to claim 1, wherein the first shell includes a border which surrounds a section of an inner portion of a surface of the first shell which is to be filled by the part that is to be molded, the border forming a fraction of a perimeter of the inner portion in the main plane, and the border being elevated relative to the inner portion so as to contain material of the part to be molded on the inner portion.

6. The mold according to claim 5, wherein when the mold is in the closed position, the first and second slides are in contact with each other and with the border so as to form the entire perimeter of the inner portion.

* * * * *